United States Patent
Pawlowski

Patent Number: 5,956,516
Date of Patent: Sep. 21, 1999

[54] MECHANISMS FOR CONVERTING INTERRUPT REQUEST SIGNALS ON ADDRESS AND DATA LINES TO INTERRUPT MESSAGE SIGNALS

[75] Inventor: Stephen S. Pawlowski, Beaverton, Oreg.

[73] Assignee: Intel Corporation, Santa Clara, Calif.

[21] Appl. No.: 08/997,103

[22] Filed: Dec. 23, 1997

[51] Int. Cl.$^6$ ............................................ G06F 9/46
[52] U.S. Cl. ..................... 395/733; 395/868; 395/309
[58] Field of Search ................................ 395/733, 736, 395/739, 868, 309

[56] References Cited

U.S. PATENT DOCUMENTS

| | | | |
|---|---|---|---|
| 4,626,985 | 12/1986 | Briggs | 395/800.4 |
| 4,734,882 | 3/1988 | Romagosa | 395/733 |
| 5,701,496 | 12/1997 | Nizar et al. | 395/739 |
| 5,727,217 | 3/1998 | Young | 395/733 |
| 5,764,997 | 6/1998 | Gulick | 395/733 |
| 5,828,891 | 10/1998 | Benayoun et al. | 395/742 |

Primary Examiner—Gopal C. Ray
Attorney, Agent, or Firm—Alan K. Aldous

[57] ABSTRACT

In one embodiment of the invention, an apparatus includes address and data ports to receive an interrupt request signal in the form of address signals and data signals. The apparatus also includes decode logic to receive at least some of the address signals and data signals and provide a decoded signal at one of several decode output lines of the decode logic. A redirection table includes a send pending bit that is set responsive to the decode signal. In another embodiment, an apparatus includes dedicated interrupt ports to receive an interrupt request signal. The apparatus also includes address and data ports capable of receiving an interrupt request signal in the form of address signals and data signals, and decode logic to provide a decode signal at one of several decode output lines in response to reception of the interrupt request signal in the form of address signals and data signals. A redirection table includes a send pending bit to be set in response to either the interrupt request signal at the dedicated interrupt ports or in response to the decode signal.

16 Claims, 6 Drawing Sheets

5,956,516

MECHANISMS FOR CONVERTING INTERRUPT REQUEST SIGNALS ON ADDRESS AND DATA LINES TO INTERRUPT MESSAGE SIGNALS

BACKGROUND OF THE INVENTION

1. Technical Field of the Invention

The present invention relates to interrupts in a computer system.

2. Background Art

A peripheral component interconnect (PCI) Local Bus Specification (Revision 2.1) ("PCI bus specification") has been developed to define a PCI bus. The PCI bus specification defines an interconnect mechanism and transfer protocol for devices on the bus. Additions or changes to the PCI specification are occasionally made. However, a guiding principle of the PCI specification is that of backward compatibility, wherein newer PCI systems will support older PCI peripheral devices.

Various devices including input and/or output (I/O) peripheral devices may seek to interrupt a processor in a computer system. When associated with a PCI bus, the devices are sometimes referred to as PCI agents. To interrupt a processor, the PCI agent may send one or more of interrupt request signals INTA#, INTB#, INTC#, or INTD# to an interrupt controller. The interrupt controller responds by providing an interrupt message to a processor. The interrupt controller receives the interrupt request signal through interrupt input pins. The interrupt input pins are sometimes called interrupt request (IRQ) pins, which are connected through IRQ lines to the PCI bus. There may be an interrupt router between the peripherals and the interrupt controller.

There are two types of signaling semantics for interrupt signals received by interrupt controllers: (1) edge triggered interrupt semantics and (2) level triggered interrupt semantics. With edge triggered interrupts, every time an edge (e.g., positive going edge) is detected at an interrupt input pin, the interrupt controller triggers an interrupt event. A problem with edge triggered interrupts is that the interrupt controller may miss an edge of a second interrupt if it occurs before a first interrupt is serviced. Accordingly, in the case of edge triggered interrupts, typically only one peripheral device is connected to the interrupt input pin.

With level triggered interrupts, a particular logical voltage level (e.g., a logical high voltage) at the interrupt input pin causes the interrupt controller to trigger an interrupt event. In the case of level triggered interrupts, more than one peripheral device may provide interrupt request signals to an input pin. However, the voltage level at the interrupt input pin provided by multiple peripheral devices is not different than the voltage level that is provided by only one peripheral device. Accordingly, the interrupt controller cannot determine how many peripheral devices are providing an interrupt request signal merely by sensing the voltage level at the interrupt input pin. In response to detecting a change to the particular voltage level at the interrupt input pin, an interrupt message is sent to a processor and a state bit is set in an I/O redirection table in the interrupt controller. The state bit is reset when an end-of-interrupt (EOI) signal is received by the interrupt controller. If an interrupt signal having the particular voltage level is still detected at the interrupt input port after the EOI is received, another interrupt message is sent to a processor.

Interrupt controllers have a limited number of interrupt input pins. Under the present technology, as more peripheral devices are added to a computer system, the number of interrupt input pins will need to be increased or peripheral devices may need to wait longer for service of interrupts.

Accordingly, there is a need for an improved system for providing interrupt requests from peripheral devices to processors.

SUMMARY OF THE INVENTION

In one embodiment of the invention, an apparatus includes address and data ports to receive an interrupt request signal in the form of address signals and data signals. The apparatus also includes decode logic to receive at least some of the address signals and data signals and provide a decoded signal at one of several decode output lines of the decode logic. A redirection table includes a send pending bit that is set responsive to the decode signal.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

Figure 1:
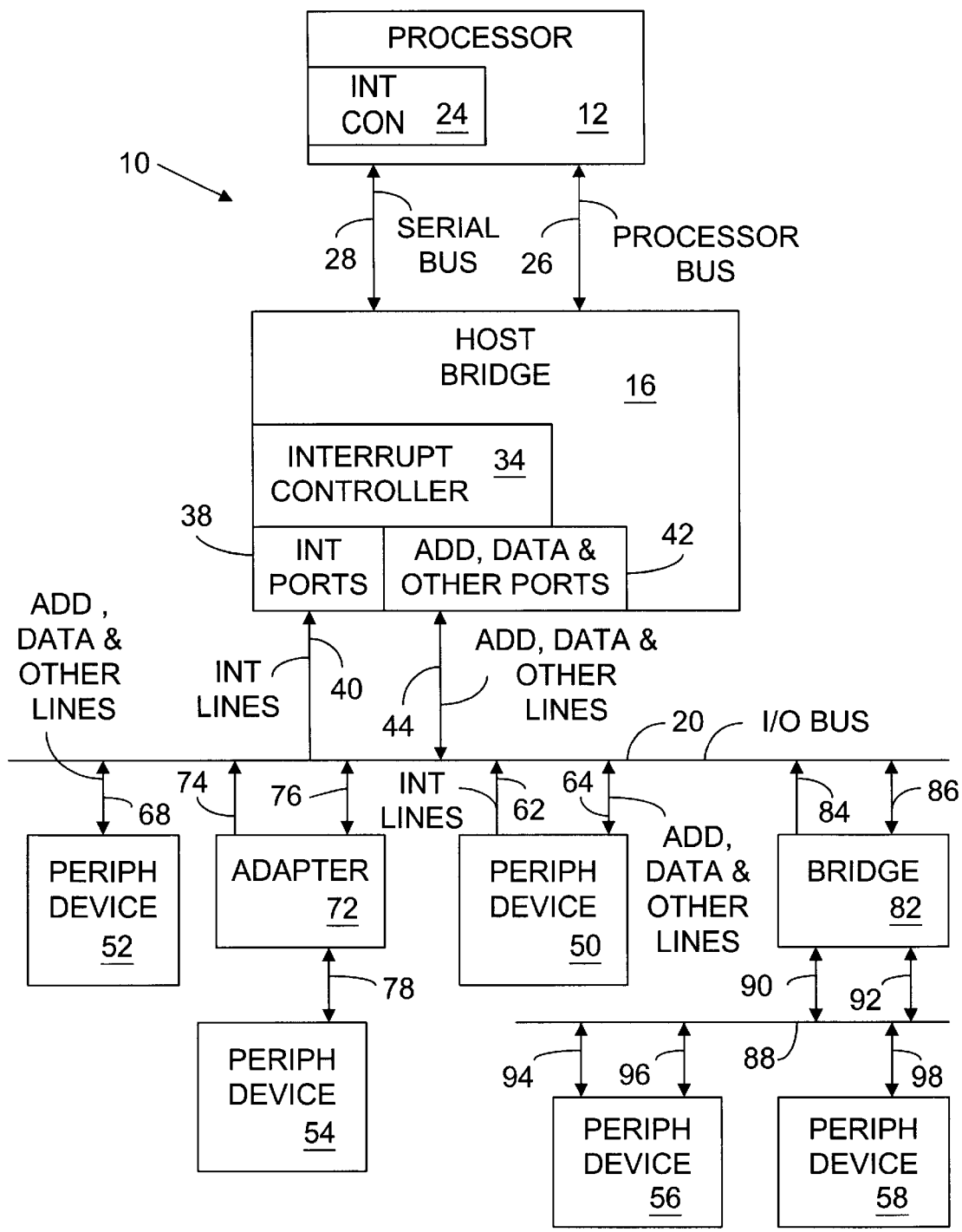
FIG. 1 is a block diagram representation of a computer system including a host bridge according to one embodiment of the present invention.

Referring to FIG. 1, a computer system 10 includes a processor 12, a host bridge 16, and an I/O bus 20, which may be implemented according to PCI specifications. Processor 12 includes an interrupt controller 24, which may be an advance programmable interrupt controller (APIC). Processor 12 is coupled to host bridge 16 through a processor bus 26 and a serial bus 28, which may be an APIC serial bus. In some embodiments, host bridge 16 is referred to as a North Bridge and processor bus 26 is referred to as a front side bus or parallel bus.

Serial bus 28 may provide interrupt messages from an interrupt controller 34 in host bridge 16 to interrupt controller 24. Interrupt controller 34 may be an APIC. Serial bus 28, which may include two data conductors and a clock signal conductor, may also provide signals from processor 12 to interrupt controller 34, such as end-of-interrupt (EOI) signals. In multi-processor systems, serial bus 28 may also be used in lowest priority interrupt destination arbitration according to known techniques.

Host bridge 16 includes dedicated interrupt (e.g., IRQ) ports 38 through which interrupt request signals (e.g., IRQ signals) are received from interrupt request lines 40. Interrupt ports 38 may be pins, other structure, or simply conductors. Interrupt controller 34 receives the interrupt request signals from ports 38. In one embodiment, interrupt ports 38 are considered part of interrupt controller 34 (and, therefore, also part of host bridge 16). In another embodiment, interrupt ports 38 are considered part of host bridge 16, but not interrupt controller 34. The difference is not important so long as interrupt controller 38 receives interrupt request signals.

Host bridge 16 also includes address, data & other ports 42 through which address, data, and other signals are received from or provided to address, data & other lines 44. Ports 42 may be pins, other structure, or any other conductor. Ports 38 and 42 may be simply continuations of lines 40 and 44. Interrupt controller 34 receives at least some of the address, data, and/or other signals passing through ports 42. Some or all of the address, data, and other signals received at ports 42 are used in host bridge 16 and elsewhere for various purposes other than interrupts. Lines 40 and 44, as well as the various other lines described herein, may be conventional conductor traces or various other forms of conductors. Depending on the embodiment of the invention, lines 40 and 44 maybe considered part of or separate from bus 20.

System 10 includes peripheral devices that may interrupt processor 12 through providing interrupt request signals to interrupt controller 34. Examples of peripheral devices and related interconnections are illustrated in FIG. 1. Peripheral device 50 is coupled to I/O bus 20 through interrupt line(s) 62 and through address, data & other lines 64. To interrupt processor 12, peripheral device 50 provides an interrupt request signal (e.g., INTA#) on interrupt line(s) 62. The interrupt request signal is passed through bus 20 and interrupt lines 40 to interrupt ports 38. Interrupt controller 34 responds to the interrupt request signal by providing an appropriate interrupt message to processor 12 or another processor (not shown in FIG. 1).

Peripheral device 52 is coupled to I/O bus 20 through address, data & other lines 68, but not through interrupt line(s). To interrupt processor 12, peripheral device 52 provides an interrupt request signal on address, data & other lines 68. In one embodiment of the invention, discussed in greater detail below, the interrupt request signal involves a PCI write cycle. The interrupt request signal is passed through bus 20 and address, data & other lines 44. Interrupt controller 34 responds to the interrupt request signal by providing an appropriate interrupt message to processor 12 or another processor (in the case of a multi-processor system not shown in FIG. 1).

Accordingly, host bridge 16 may provide interrupt messages to processor 12 or another processor in response to interrupt request signals from two types of peripheral devices. A first type of peripheral device (e.g., peripheral device 50) provides interrupt request signals (e.g., INTA#) through dedicated interrupt line(s). The interrupt request signals are received by interrupt controller 34 through interrupt ports 38. A second type of peripheral device (e.g., peripheral device 52) provides interrupt request signals (e.g., including a PCI write cycle) through, for example, address and data lines. The interrupt request signals are received by interrupt controller 34 through address, data & other lines 44.

Peripheral devices 54, 56, and 58 illustrate other possible interfaces between peripheral devices and bus 20. Peripheral device 54 is coupled to bus 20 through an adapter 72. Adapter 72 may conduct interrupt signals through line(s) 74 and address, data & other signals through lines 76. Interrupt request signals that are provided on conductors 74 are passed by bus 20 to interrupt lines 40. Peripheral device 54 is like peripheral device 52 in that it provides interrupt request signals through address, data and other signals, not through an interrupt line(s) 74. Therefore, in the case of peripheral device 54, there are no interrupt request signals on interrupt lines 74. However, a peripheral device like peripheral device 50 could be connected to adapter 72. In that case, adapter 74 would include interrupt signals on line(s) 74. Alternatively, some adapters could include only lines 76 and not line(s) 74. Peripheral devices 56 and 58 are coupled to bus 20 through a bridge 82. Interrupt request signals are conducted through lines 94, 90, and 84. Address, data & other signals are conducted through lines 98, 96, 92, and 86.

Figure 2:
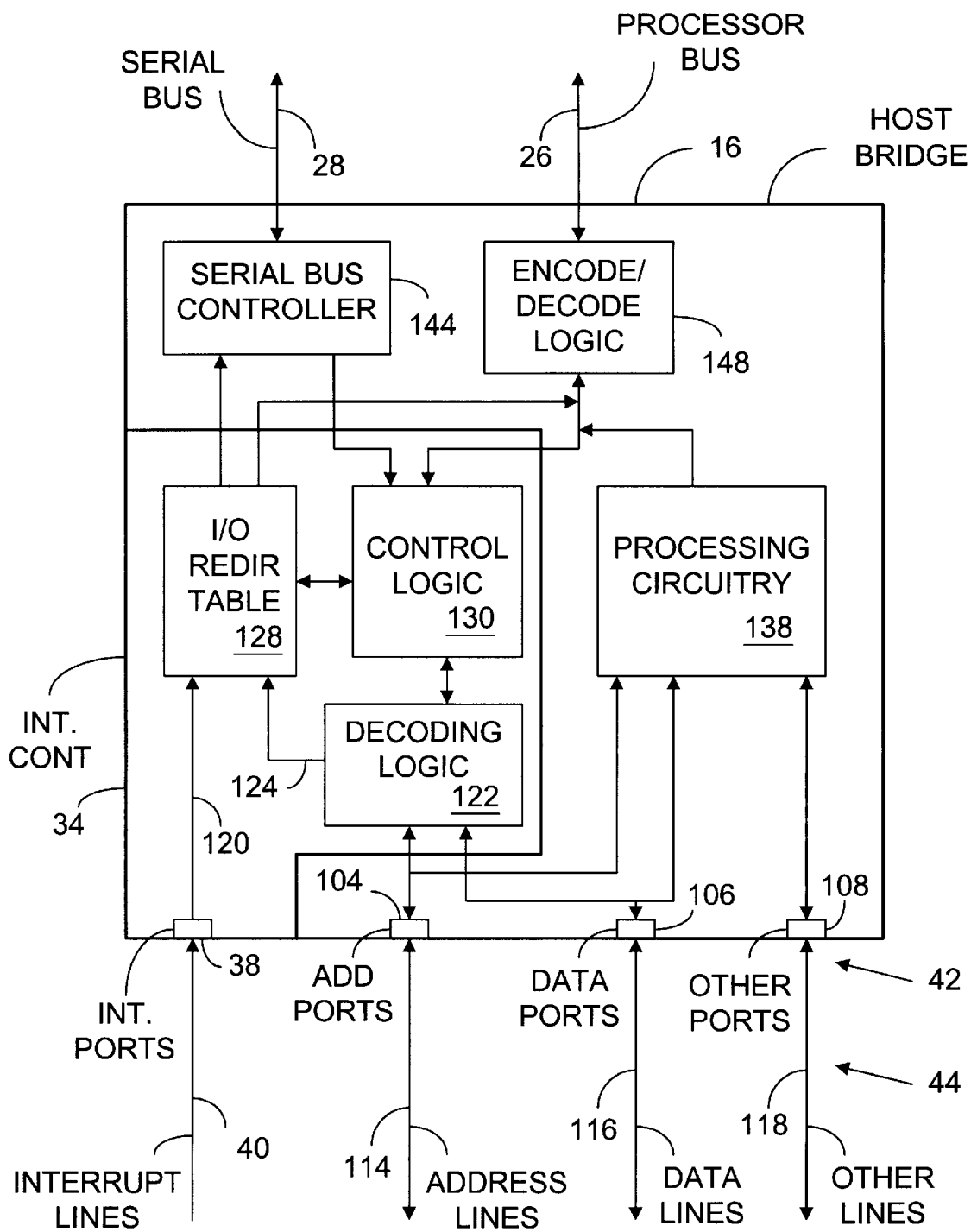
FIG. 2 is a block diagram representation of one embodiment of the host bridge in the system of FIG. 1.

FIG. 2 shows details of one embodiment of host bridge 16. Address, data & other ports 42 includes address ports 104, data ports 106, and other ports 108. Address, data, and other lines 44 include address lines 114, data lines 116, and other lines 118, which conduct address signals, data signals, and other signals (e.g., enable signals), respectively.

An interrupt request signal on interrupt lines 40 is provided through ports 38 and conductors 120 to I/O redirection table 128 or other processing circuitry. In response thereto, interrupt controller 34, including I/O redirection table 128, provides an interrupt message to a processor. The interrupt message may be provided through serial bus 28 through serial bus controller 144 or through processor bus 26 through encode/decode logic 148. In the case of sending the interrupt message over processor bus 26, processor 12 would include decode circuitry to detect the interrupt message and interrupt controller 24 would understand the message.

In response to receiving an interrupt request signal, at least a portion of which is in the form of address signals, interrupt controller 34 provides an interrupt message to serial bus 28 or processor bus 26. In one embodiment, host bridge 16 can direct the interrupt message either through serial bus 28 or processor bus 26 depending on a bit in control logic 130.

The interrupt message over processor bus 26 could include an address identifying the processor to receive the interrupt. Host bridge 16 could include lowest priority redirection circuitry to redirect the interrupt to the processor having the lowest priority in the case of a multi-processor system. The circuitry could keep track of task priorities of the various processors in a multi-processor system. Interrupt controller 34 or other circuitry in host bridge 16 could detect whether processor 12 includes serial bus capabilities and/or the ability to accept interrupt messages by processor bus 26. In the case where processor 12 does not include an interrupt controller and decode circuitry that understands an interrupt message over processor bus 26, interrupt controller 34 could direct the interrupt message over serial bus 28 rather than over processor bus 26. Host bridge 16 may include queues (not shown) to hold various interrupt signals and other signals. Interrupt controller 34 may include queues to hold interrupt request signals. Control logic 130 assists in various functions of interrupt controller 34.

An interrupt request signal may be provided in the form of address and data signals (and perhaps other signals) through ports 42 and captured by interrupt controller 34. In such a case, decoding logic 122 decodes all or part of the address and data signal bits as being an interrupt request signal. In one embodiment, decoding logic 122 provides a decoded signal on conductors 124. In one embodiment, the decode signal may be an assertion or a deassertion signal. The interrupt request assertion/deassertion signals on conductors 124 may be the same as the interrupt request signals on conductors 120. In that case, I/O redirection table 128 could treat the signals identically.

Figure 3:
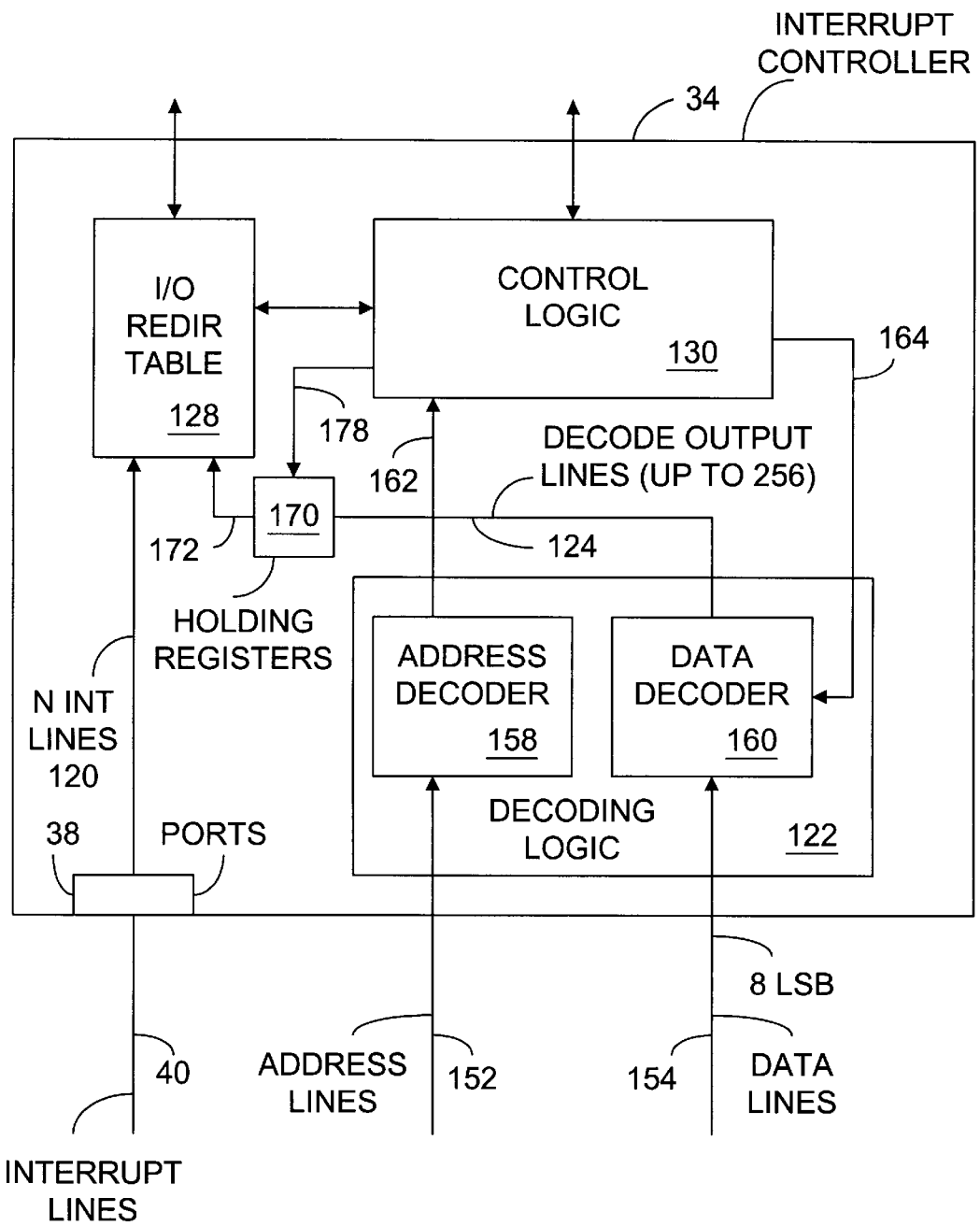
FIG. 3 is a block diagram representation of one embodiment of the interrupt controller in the system of FIG. 1.

Referring to FIG. 3, in one embodiment, decoding logic 122 includes an address decoder 158 and a data decoder 160. If a particular address or an address within a particular range is received, address decoder 158 provides a signal to control logic 130 on conductor(s) 162 indicating that an interrupt request signal is being provided to interrupt controller 34 through address and data lines 152 and 154, which are connected to lines 114 and 116. In one embodiment, an address indicating an interrupt request signal includes a base plus an offset. As an example, the base could be FEC00000h (where h=hex). The offset could be 20h. The base may be programmable by the processor, operating system, or other hardware or software. Control logic 130 provides an enabling signal on conductor(s) 164 to data decoder 160. In one embodiment, data decoder 160 decodes the 8 least significant bits (LSBs) of the data signal and asserts one of X decode output lines 124, depending on the state of the data bits. If there are 8 data bits, there may be up to 256 decode output lines 124.

Holding registers 170 include a register for each one of decode output lines 124. Each of the holding register holds the voltage state on a corresponding one of decode output lines 124. In turn, lines 172 provide signals representing the voltage state held in holding registers 170. A holding register is set (e.g., has a logic high voltage) through an assertion signal on the corresponding one of lines 124 and is reset through a deassertion signal on the corresponding one of lines 124. The difference between the assertion and deassertion signals may be merely opposite polarity. In one embodiment, a different address on conductors 152 controls whether an assertion or deassertion signal is provided on decode output lines 124. In another embodiment, different data signals on conductors 154 control whether an assertion or deassertion signal is provided on a particular one of decode output lines 124.

Figure 4:
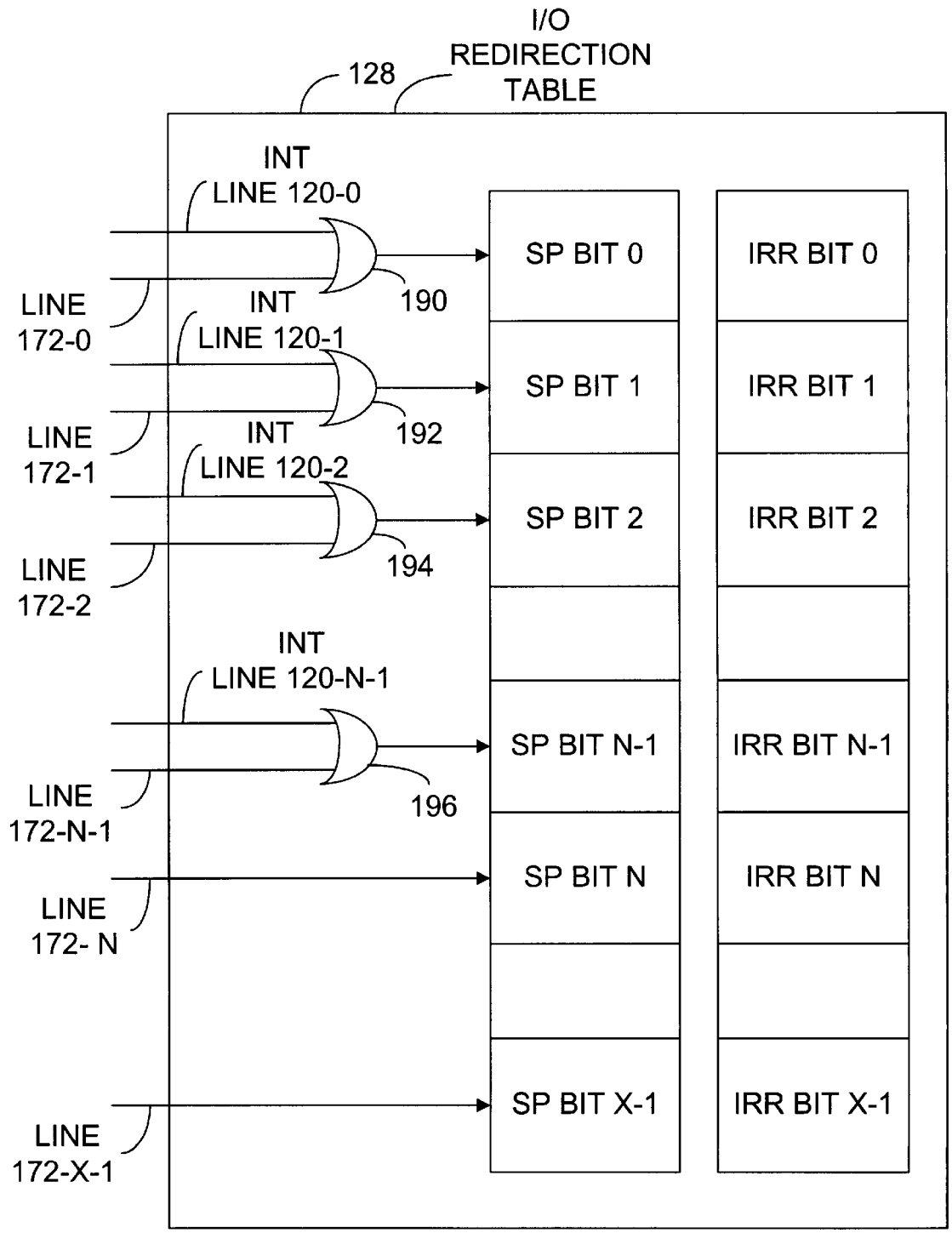
FIG. 4 is a block diagram representation of one embodiment of send pending bits and related circuitry in the I/O redirection table of FIGS. 2 and 3.

Referring to FIGS. 3 and 4, lines 172 include lines 172-0, 172-1, . . . , 172-X-1, each connected to a different one of holding registers 170. Interrupt lines 120 include interrupt lines 120-0, 120-1, 120-2, . . . , 120-N-1, each connected to a different one of interrupt ports 38. In the embodiment of FIG. 4, I/O redirection table 128 includes X entries, which each include a "send pending" (SP) bit (which may be called a delivery status bit). When an SP bit is set, an interrupt message is sent to a processor. SP bits 0-N-1 are set (e.g., to a logic high voltage) when the output of a corresponding OR-gate 190, 192, 194, . . . , 196 is asserted. The OR-gates have inputs of one of lines 120 and one of lines 172. Accordingly, an interrupt signal to either one of ports 38 or to decoding logic 122 may cause one of SP bits 0-N-1 to be set. For example, SP bit 0 is set when either interrupt line 120-0 or line 172-0 is set. (The OR-gates could be replaced with other logic if SP bits are set through a low voltage. There could be inverters between interrupt ports 38 and the OR gates). SP bits N-X-1 are set when a corresponding one of lines 172-N–172-X-1 is asserted. In this way, there may be a greater number of SP bits than interrupt ports 38. (Note that in the some embodiments and in certain circumstances, the states of the SP bits 0-X-1 may be controlled by signals other than those from lines 120 or 172).

Interrupt controller 34 may support scalability for edge triggered interrupt request signals. In the case of edge triggered interrupts on lines 152 and 154, data decoder 160 asserts one of lines 124. The corresponding one of holding registers 170 is set, causing a correponding one of lines 172 to be asserted. Assertion of one of lines 172 causes the corresponding one of SP bits is set. When the SP bit is set, the particular one of holding registers 170 is reset through conductors 178. This I/O redirection entry may be then entered into the interrupt delivery rotation scheme to be delivered at the appropriate time. There is no need to initiate an interrupt request deassertion register operation when the interrupt event is removed, because the activation of the signal itself may indicate that one and only one interrupt event will be signaled. As with the input pin scheme, the SP bit of an interrupt defined as edge triggered may be reset when the interrupt has been successfully delivered on the associated message mechanism. If multiple interrupt request assertion register operations are received to the same I/O redirection table entry before the interrupt has been delivered to the destination only one interrupt event may be detected. This behavior is consistent with the dedicated pin scheme.

With respect to level triggered interrupts, when a device signals an interrupt for a line that is shared by multiple devices, that device may issue an interrupt request operation on the first activation of the interrupt. When the interrupt signal goes inactive, the device may issue an interrupt request deassertion message to interrupt controller 34. Interrupt controller 34 maintains the activation of the corresponding holding register bit until the deassertion message is received. The constraint of this mechanism is that both the device collecting the input events and the interrupt controller are cognizant that the interrupt request is configured as a level triggered interrupt event. For these events, the interrupt request deassertion register transactions may be required for correct operation. Signals on lines 116 or 118 may indicated whether an edge or level triggered interrupt signal is involved.

In the embodiment of FIG. 4, I/0 redirection table 128 also includes interrupt request register (IRR) bits 0, 1, . . . , X-1, which are used in the case of level triggered interrupts. The SP bit is reset when the IRR bit is set. The IRR bit is set when an interrupt message is accepted by the processor. Either a level assert message is issued and not retried on processor bus 16 or a message on serial bus 28 is accepted. The IRR bit is reset when an EOI message is received. For both serial and parallel bus delivery, the IRR bit is reset with a write to the corresponding EOI register, the vector of which matches the vector field of the redirection entry.

When an interrupt is serviced, a deassertion signal is provided by the peripheral device to decode logic 122. If after the IRR bit is reset, the corresponding holding register is set, then there is another interrupt waiting to be acknowledged. The corresponding SP bit is then set.

Figure 5:
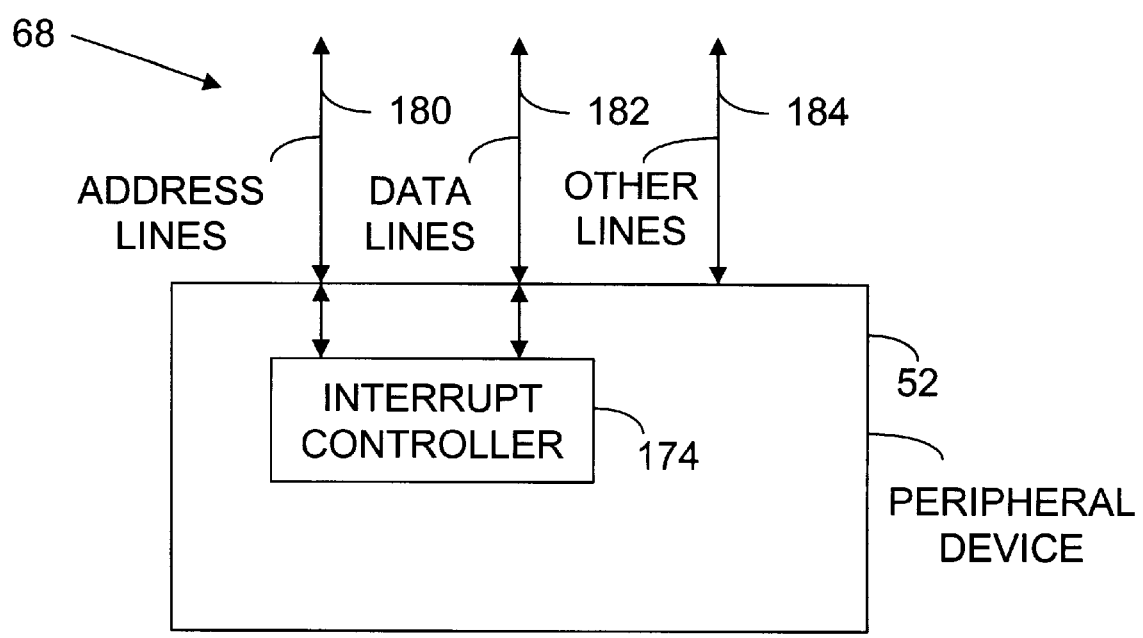
FIG. 5 is a block diagram representation of an exemplary peripheral device.
Figure 6:
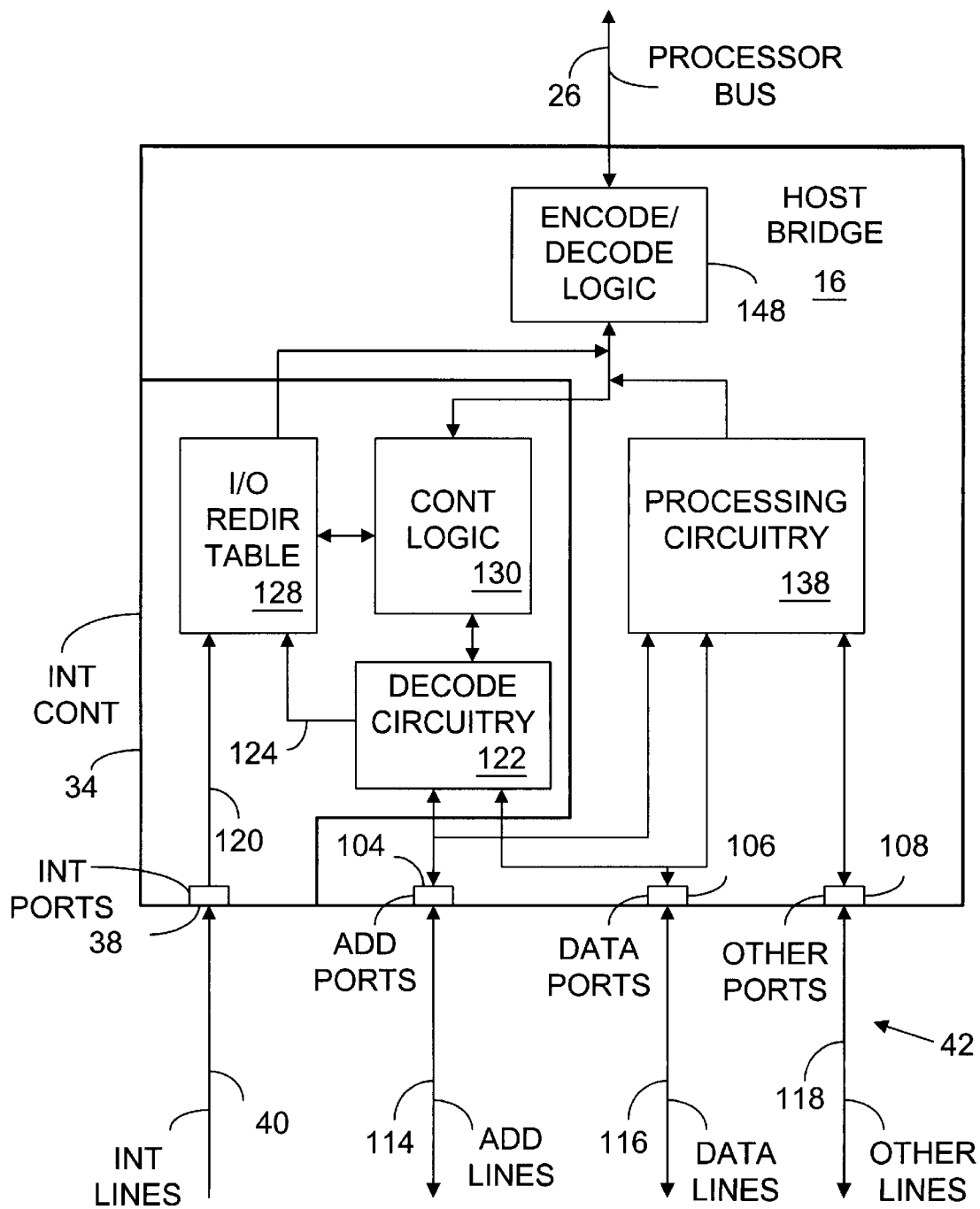
FIG. 6 is a block diagram representation of an alternative embodiment of a host bridge in the system of FIG. 1.

FIG. 5 illustrates details of one embodiment of peripheral device 52. Address, data & other lines 68 include address lines 180, data lines 182, and other lines 184. An interrupt controller 174 provides interrupt request signals to at least some of the bits of address lines 180. The interrupt request signal may also include bits on data lines 182 and/or other lines 184. In one embodiment, interrupt controller 174 includes a data register(s) the contents of which control whether peripheral device 52 sends interrupt request signals in the form of an interrupt signal to a dedicated interrupt port or in the form of address and data signals, and particular details regarding the signals.

An advantage of the invention is that level triggered interrupts on interrupt lines 40 may be replaced by write cycle messages or other address signal based messages. In one embodiment, the write cycle message may identify the origin of the interrupt request. Further, the number of send pending bits may be easily increased without the adding dedicated interrupt lines.

Interrupt controller 34 may support multiple interrupt request signal input mechanisms. However, in order to avoid any race conditions that may occur, in one embodiment, only one mechanism per interrupt request signal is supported at a given time. The interaction of the various arrival times and rates may be identical to the dedicated port (e.g., pin) approach. Multiple activations of an event from a device will elicit the interrupt request assertion/deassertion signal which may provide a model consistent with the operation of the dedicated port.

Each interrupt controller may have a unique address for configurability and any access to this address space, regardless of the initiating resource may reach the final destination. As an example, if a system contains two I/O buses, the first contains the interrupting device and the second contains the interrupting controller. The interrupting device, through the unique address of the interrupting controller, may be capable of directing an interrupt request assertion signal to the interrupting controller. Note that this messaging scheme does not require a 'sidecar' path for interrupts that is different than the path to main memory. Signaling the interrupt request assertion signal may have the effect of flushing any previous write transactions.

Additional Information and Embodiments

The specification does not describe or illustrate various well known components, features, and conductors, a discussion of which is not necessary to understand the invention and inclusion of which would tend to obscure the invention. Furthermore, in constricting an embodiment of the invention, there are design tradeoffs and choices, which would vary depending on the embodiment. There are a variety of ways of implementing the illustrated and unillustrated components.

The borders of the boxes in the figures are for illustrative purposes and do not restrict the boundaries of the components, which may overlap. The relative size of the illustrative components does not to suggest actual relative sizes. Arrows show principle data flow in one embodiment, but not every signal, such as requests for data flow. As used herein "logic" does not mean that software control cannot be involved. The term "conductor" is intended to be interpreted broadly and includes devices that conduct although they also have some insulating properties. There may be intermediate components or conductors between the illustrated components and conductors.

The interrupt message provided by interrupt controller 34 to interrupt controller 24 may be somewhat altered in host bridge 16, processor bus 26, and/or serial bus 28 prior to it being received by interrupt controller 24. For example, bits of the interrupt message provided by interrupt controller 34 could be inverted or encoded. Address bits could be added by encode/decode logic or other circuitry.

In one embodiment, host bridge 16 does not include the capability to send interrupt messages over processor bus 26. In that embodiment, conductors might not connect I/O redirection table 128 to encode/decode logic 148. As shown in FIG. 5, in another embodiment, host bridge 16 does not include the capability to send interrupt messages over serial bus 28. In that embodiment, serial bus controller 144 and associated conductors are not included in host bridge 16.

In one embodiment, a signal on processor bus 26 is two phase signal. In the first phase, if an Aa3# bit is 0, the interrupt transaction type is fixed (directed); if the Aa3# bit is 1, the type is redirected or EOI. In the second phase, Ab5# and Ab6# bits of 00 indicate physical destination mode, and Ab5# and Ab6# bits of 01 indicate logical destination mode. Ab5# and Ab6# bits of 11 indicate an EOI. Aa3# and Ab6# bits of 0 and 1 and Aa3#, Ab5#, and Ab6# bits of 110 are reserved.

The holding registers and SP bits may be in parallel with respect to conductors 124.

Interrupt controller 34 does not have to be part of host bridge 16. There may be an interrupt router between the peripheral devices (interrupting agents or PCI devices) and the interrupt controller. Decode logic 122 may be outside interrupt controller 34.

The phrase "in one embodiment" means that the particular feature, structure, or characteristic following the phrase is included in at least one embodiment of the invention, and may be included in more than one embodiment of the invention. Also, the appearances of the phrase "in one embodiment" in various places in the specification are not necessarily all referring to the same one embodiment.

The term "connected" and "coupled" and related terms are used in an operational sense and are not necessarily limited to a direct connection or coupling. If the specification states a component or feature "may", "can", "could", or "might" be included or have a characteristic, that particular component or feature is not required to be included or have the characteristic. The term "responsive" includes completely or partially responsive.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. An apparatus, comprising:

address and data ports to receive an interrupt request signal in the form of address signals and data signals;

decode logic to receive at least some of the address signals and data signals and to provide a decoded signal at one of several decode output lines of the decode logic; and a redirection table including a send pending bit that is set responsive to the decode signal.

2. The apparatus of claim 1, further including a holding register that are set in response to assertion of the decoding signal.

3. The apparatus of claim 1, wherein the interrupt request signal is in the form of the address signals, the data signals, and other signals.

4. The apparatus of claim 1, wherein the apparatus is a bridge.

5. An apparatus, comprising:

dedicated interrupt ports to receive an interrupt request signal;

address and data ports capable of receiving an interrupt request signal in the form of address signals and data signals;

decode logic to provide a decode signal at one of several decode output lines in response to reception of the interrupt request signal in the form of address signals and data signals; and a redirection table including a send pending bit to be set in response to either the interrupt request signal at the dedicated interrupt ports or in response to the decode signal.

6. The apparatus of claim 5, wherein OR gates are positioned between the interrupt ports, some of the decode lines, and the redirection table.

7. An apparatus, comprising:
   dedicated interrupt ports to receive an interrupt request signal from interrupt request lines;
   address and data ports to receive address and data signals;
   decode logic to receive at least some of the address and data signals and to decode an interrupt request signal from them; and
   redirection and control circuitry coupled to the dedicated interrupt request ports and the decode logic to receive the interrupt request signal from the interrupt ports and the interrupt request signal from the decode logic and in response thereto to provide an interrupt message.

8. The apparatus of claim 7, wherein the interrupt request signal provided by the decode logic is identical to the interrupt request signal provided by the dedicated interrupt ports.

9. The apparatus of claim 7, wherein the redirecton and control circuitry includes an I/O redirection table.

10. The apparatus of claim 7, wherein the decode logic is included in an interrupt controller.

11. An apparatus, comprising:
    dedicated interrupt ports to receive an interrupt request signal from interrupt request lines;
    address and data ports to receive address and data signals;
    decode logic to receive at least some of the address and data signals and to decode an interrupt request signal from them; and
    an I/O redirection table coupled to the dedicated interrupt request ports and the decode logic to receive the interrupt request signal from the interrupt ports and the interrupt request signal from the decode logic and in response thereto to provide an interrupt message.

12. The apparatus of claim 11, wherein the interrupt request signal provided by the decode logic is identical to the interrupt request signal provided by the dedicated interrupt ports.

13. The apparatus of claim 11, wherein the decode logic is included in an interrupt controller.

14. A computer system, comprising:
    a processor;
    an I/O bus;
    peripheral devices connected to the I/O bus; and
    a bridge including:
        dedicated interrupt ports to receive an interrupt request signal;
        address and data ports to receive address and data signals;
        decode logic to receive at least some of the address and data signals and to decode an interrupt request signal from them; and
        redirection and control circuitry coupled to the dedicated interrupt request ports and the decode logic to receive the interrupt request signal from the interrupt ports and the interrupt request signal from the decode logic and in response thereto to provide an interrupt message.

15. The system of claim 14, wherein at least one of the peripheral devices provide interrupt request signals through the dedicated interrupt ports and at least one of the peripheral devices provides interrupt request signals in the form of write cycles through the address and data ports.

16. The system of claim 14, wherein at least one of the peripheral devices can provide address and data signals to the decode logic for decoding an interrupt request signal from them.

* * * * *

UNITED STATES PATENT AND TRADEMARK OFFICE
CERTIFICATE OF CORRECTION

PATENT NO. : 5,956,516
DATED : September 21, 1999
INVENTOR(S) : Pawlowski

It is certified that error appears in the above-identified patent and that said Letters Patent is hereby corrected as shown below:

In column 3, at line 13, delete "38" and insert --34--.
In column 3, at line 66, delete "74" and insert --72--.
In column 5, at line 29, delete "register" and insert --registers--.
In column 5, at line 62, delete "the"
In column 6, at line 2, delete "correponding" and insert --corresponding--.
In column 6, at line 4, delete "is" and insert --to be--.
In column 6, at line 34, delete "indicated" and insert --indicate--.
In column 6, at line 43, delete "16" and insert --26--.
In column 7, at line 4, delete "the".
In column 7, at line 34, delete "constricting" and insert --constructing--.
In column 7, at line 42, delete "to"
In column 7, at line 43, delete "principle" and insert --principal--.
In column 7, at line 66, insert "a"
In column 8, at line 47, delete "are" and insert --is--.
In column 8, at line 63, delete "and"

Signed and Sealed this

Twenty-fourth Day of April, 2001

Attest:

*Attesting Officer*

NICHOLAS P. GODICI

*Acting Director of the United States Patent and Trademark Office*